(12) United States Patent
Clark

(10) Patent No.: US 9,566,894 B2
(45) Date of Patent: Feb. 14, 2017

(54) BULKHEAD TETHER APPARATUS

(71) Applicant: Signode Industrial Group LLC, Glenview, IL (US)

(72) Inventor: Toby W. Clark, Smiths, AL (US)

(73) Assignee: Signode Industrial Group LLC, Glenview, IL (US)

( * ) Notice: Subject to any disclaimer, the term of this patent is extended or adjusted under 35 U.S.C. 154(b) by 0 days.

(21) Appl. No.: 14/687,621

(22) Filed: Apr. 15, 2015

(65) Prior Publication Data
US 2016/0031360 A1     Feb. 4, 2016

Related U.S. Application Data

(60) Provisional application No. 62/031,589, filed on Jul. 31, 2014.

(51) Int. Cl.
*B60P 7/08*    (2006.01)
*B60P 7/14*    (2006.01)

(52) U.S. Cl.
CPC .................................... *B60P 7/14* (2013.01)

(58) Field of Classification Search
CPC ........................................................ B60P 7/14
USPC ....... 410/118, 130, 131, 132, 133, 134, 135, 410/137, 138, 139; 296/24.4; 220/531, 220/532, 543, 544
See application file for complete search history.

(56) References Cited

U.S. PATENT DOCUMENTS

| | | | |
|---|---|---|---|
| 1,075,961 A * | 10/1913 | Boller et al. | 410/135 |
| 3,168,055 A * | 2/1965 | Vander Hyde Edward et al. | 410/134 |
| 4,168,667 A * | 9/1979 | Loomis | 410/118 |
| 5,769,704 A | 6/1998 | Henning et al. | |
| 5,807,046 A | 9/1998 | Onken | |
| 5,947,812 A | 9/1999 | Henning et al. | |
| 5,993,310 A | 11/1999 | Onken | |
| 6,116,044 A | 9/2000 | Gothier | |
| 6,203,419 B1 | 3/2001 | Onken | |
| 6,305,128 B1 | 10/2001 | Horner et al. | |
| 6,626,753 B2 | 9/2003 | Onken | |
| 6,827,534 B2 | 12/2004 | Onken | |
| 6,877,940 B2 | 4/2005 | Nelson et al. | |
| 6,945,865 B1 | 9/2005 | Turek | |
| 7,195,435 B2 | 3/2007 | Clark | |
| 7,249,921 B2 | 7/2007 | McMahon et al. | |
| 7,300,236 B2 | 11/2007 | Nelson et al. | |
| 7,600,955 B2 | 10/2009 | Nelson et al. | |
| 7,607,874 B2 | 10/2009 | Nelson et al. | |
| 7,901,168 B2 * | 3/2011 | Fa-Kouri | 410/23 |
| 8,087,859 B2 | 1/2012 | Nelson | |
| 8,298,056 B2 | 10/2012 | Clark | |

(Continued)

*Primary Examiner* — Stephen Gordon
(74) *Attorney, Agent, or Firm* — Neal, Gerber & Eisenberg LLP

(57) ABSTRACT

Various embodiments of the present disclosure provide a bulkhead tether apparatus for a container (such as a refrigerator trailer) which generally includes a roller track, a trolley movably attachable to the roller track, a bulkhead bracket securely attachable to the bulkhead, and a relatively short chain releasably attachable to the trolley and to the bulkhead bracket. This combination enables the bulkhead to travel the length of the track, but prevents the bulkhead from being removed from the container. The combination also enables the bulkhead to be moved out of the way during loading and unloading in several different ways to facilitate loading products into and unloading products from the container.

22 Claims, 4 Drawing Sheets

(56) References Cited

U.S. PATENT DOCUMENTS

| | | |
|---|---|---|
| 8,834,083 B2 | 9/2014 | Nelson et al. |
| 2008/0190129 A1 | 8/2008 | Clark et al. |
| 2009/0320514 A1 | 12/2009 | Clark et al. |
| 2011/0011122 A1 | 1/2011 | Clark |
| 2014/0335775 A1 | 11/2014 | Clark |

* cited by examiner

BULKHEAD TETHER APPARATUS

PRIORITY CLAIM

This application claims priority to and the benefit of U.S. Provisional Patent Application Ser. No. 62/031,589, filed on Jul. 31, 2014, the entire contents of which are incorporated herein by reference.

BACKGROUND

Various different types of bulkheads are widely used in containers to secure and separate products being transported in such containers. For example, insulated bulkheads are commonly used for compartment or temperature load separation in refrigerated containers such as refrigerated trailers. Known bulkheads are configured to move in the containers to accommodate different size product loads in the containers. Known bulkheads are also configured to move out of the way when the products are being loaded into or unloaded from the containers.

More specifically, certain known bulkheads are configured to be removed from the containers to move out of the way when the products are being loaded into or unloaded from the containers. When bulkheads are removed from the containers, the removed bulkheads are often lost or not returned to the proper containers. For example, removed bulkheads are often left on loading docks after a container (such as a refrigerated trailer) has been unloaded. These bulkheads must then be replaced for subsequent product transport in such containers.

Certain other known bulkheads are configured to be raised to the ceiling of the container to move out of the way when products are being loaded into or unloaded from the containers. Certain of these known bulkhead moving systems include multiple tracks attached to the ceiling for each bulkhead and multiple hinges attached to each bulkhead. The hinges enable the bulkhead to be pivoted or rotated toward the ceiling and held adjacent to the ceiling These bulkhead moving systems include two adjacent bulkheads and four tracks attached to the ceiling (i.e., two tracks for each bulkhead). These known track systems are relatively expensive and time consuming to install and to repair.

Cable bulkhead moving systems have been tried to avoid employing these relatively expensive and time consuming ceiling track bulkhead moving systems. Cable bulkhead moving systems have not worked well because the cables tend to stretch or break, and because loaders have cut the cables.

Accordingly, there is a need to solve these problems.

SUMMARY

Various embodiments of the present disclosure provide an easy to install bulkhead tether apparatus for securing bulkheads in containers such as refrigerated trailers. Various embodiments of the present disclosure are configured for bulkhead systems which include one or more pairs of bulkheads which in use are each configured to extend partially across the container and to be suitably attached to each other by fasteners such a hook and loop type fasteners (commonly sold under the VELCRO® trademark).

More specifically, each bulkhead tether apparatus of various embodiments of the present disclosure generally includes: (a) a roller track; (b) a trolley movably attachable to the roller track; (c) a bulkhead bracket securely attachable to the bulkhead; and (d) a relatively short chain releasably attachable to the trolley and to the bulkhead bracket. The roller track is configured to be attached at a corner defined by the ceiling and one of the side walls of the container. The bulkhead on that side of the trailer is secured to the track by the roller trolley, the chain, and the bulkhead bracket.

The roller track, bulkhead bracket, and relatively short chain combination provides several advantages. This combination enables the bulkhead to travel the length of the track, but prevents the bulkhead from being removed from the container. This combination also enables the bulkhead to be moved out of the way during loading and unloading of products in several different ways. In one way, this combination enables the bulkhead to swing 90 degrees (forward or rearward) from extending across the container (in a first upright position) to extending adjacent to the side wall (in a second upright position). After swinging adjacently to the side wall, this combination also enables the bulkhead to swing upwardly 90 degrees from an upright position against the side wall to a horizontally or substantially horizontally extending position adjacent to the side wall.

Additional features and advantages of the present disclosure are described in, and will be apparent from, the following Detailed Description and the Figures.

DETAILED DESCRIPTION

Various embodiments of the present disclosure provide an easy to install bulkhead tether apparatus for securing bulkheads in containers such as refrigerated trailers. Various embodiments of the present disclosure are configured for bulkhead systems which include one or more pairs of bulkheads which in use are configured to extend across the container and be suitably attached by fasteners.

Referring now to the figures, and particularly to FIGS. 1 to 4, one embodiment of the bulkhead tether apparatus of present disclosure is generally indicated by numeral 40. The bulkhead tether apparatus 40 of the present disclosure is configured to be used in a container 10 with a bulkhead system including one or more pairs of bulkheads such as the pair of bulkheads 20 and 30.

Figure 1:
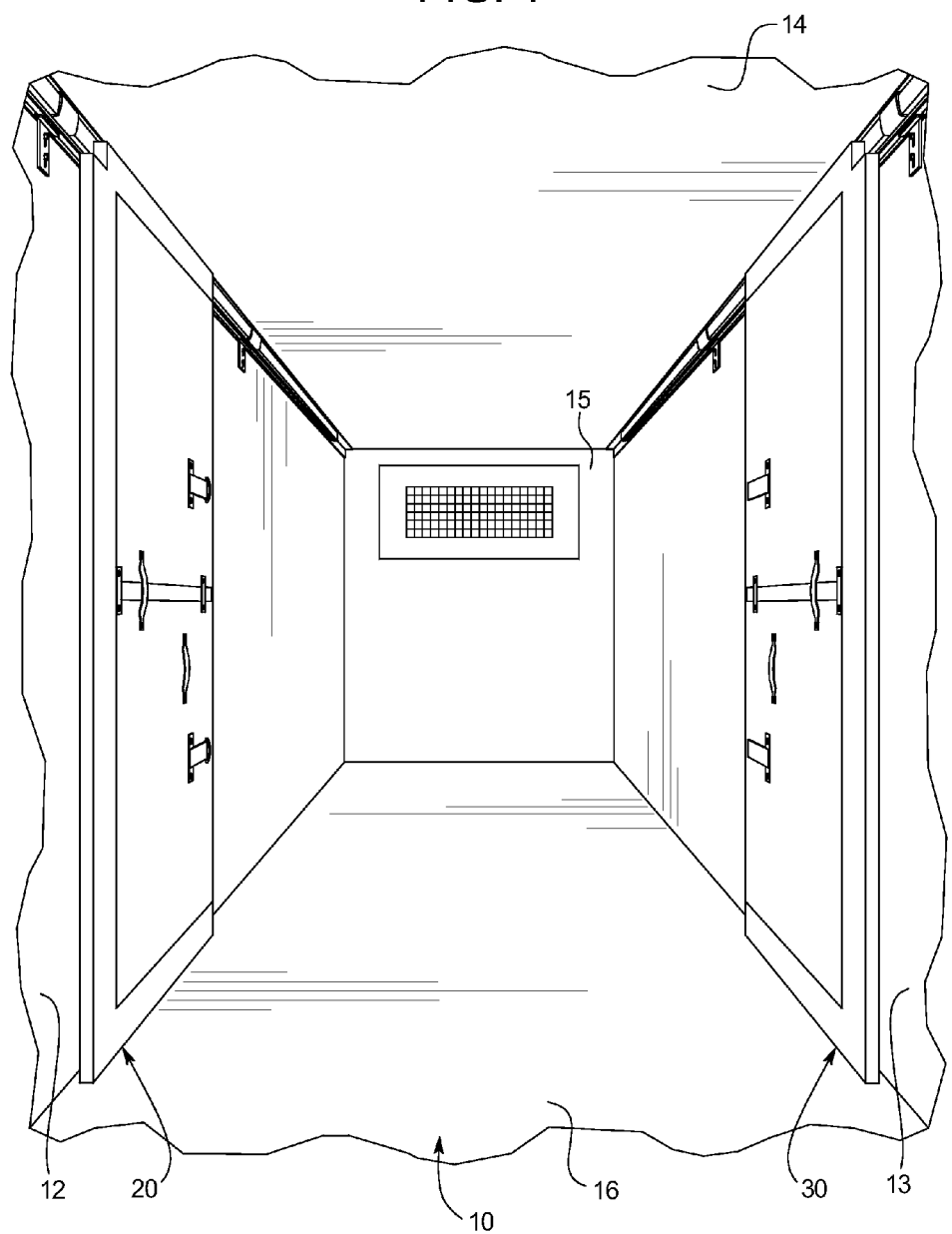
FIG. 1 is a fragmentary perspective view of the inside of a container (and specifically a refrigerated trailer), and illustrates two bulkheads each respectively attached to the container using a bulkhead tether apparatus of one embodiment of the present disclosure, and showing the bulkheads in upright storage positions adjacent to the respective opposing side walls of the container.

FIG. 1 illustrates the inside of the container 10 with the bulkheads 20 and 30 respectively attached by the bulkhead tether apparatus of the present disclosure (not shown in FIG. 1) adjacent to the side walls 12 and 13 of the container 10. FIG. 1 illustrates the bulkheads 20 and 30 in upright storage positions adjacent to the respective side walls 12 and 13.

Figure 2:
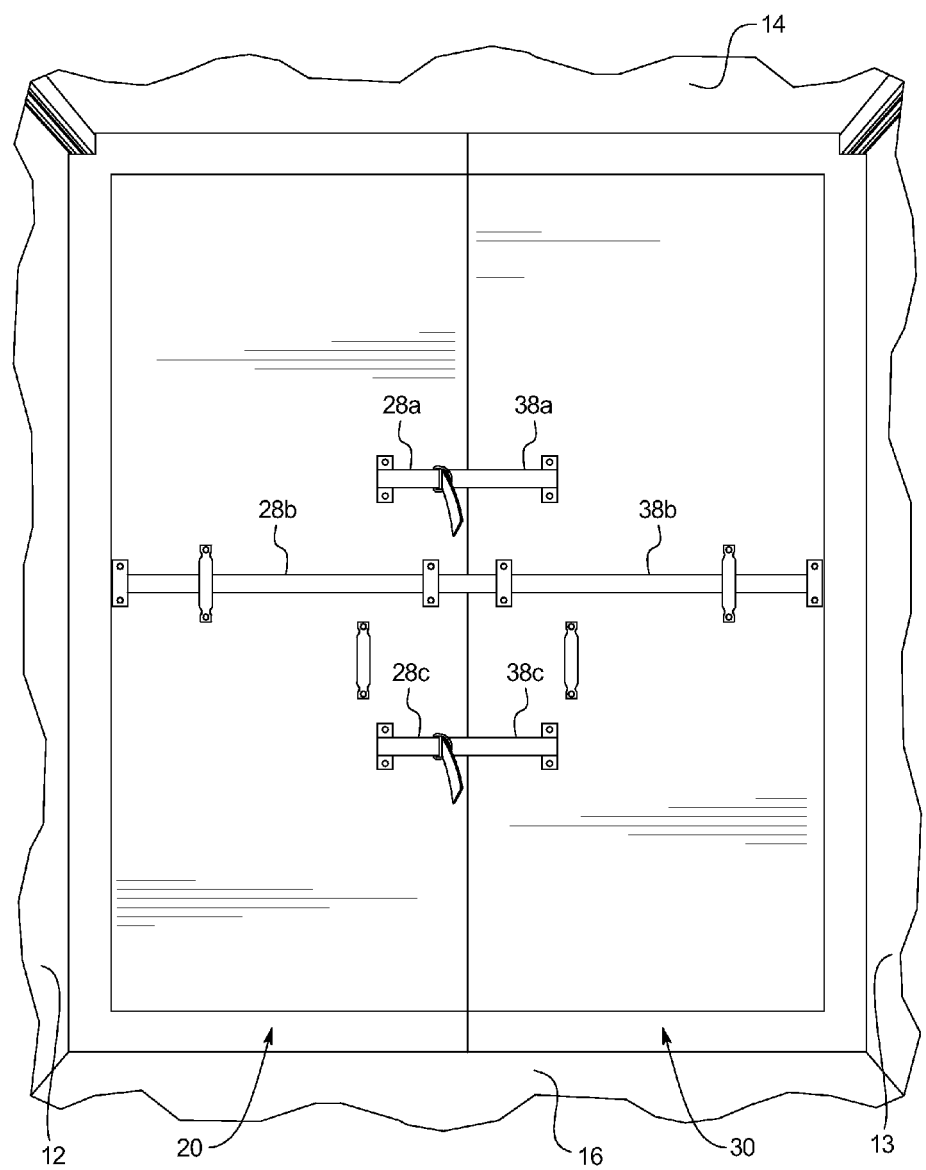
FIG. 2 is a fragmentary perspective view of the inside of the container of FIG. 1, and illustrates the two bulkheads of FIG. 1, each respectively attached to the container using a bulkhead tether apparatus of one embodiment of the present disclosure, and showing the bulkheads connected to each other in an upright in use position.

FIG. 2 illustrates the inside of the container 10 with the two bulkheads 20 and 30 respectively attached the side walls 12 and 13 of the container 10 by the bulkhead tether apparatus of the present disclosure (not shown in FIG. 2), and the bulkheads 20 and 30 in upright in-use positions extending across the container 10. In these positions, suitable fasteners 28a, 28b, 28c, 38a, 38b, as 38c are used to releasably secure bulkheads 20 and 30 together. The fasteners may be any suitable type of fasteners such a hook and loop type fasteners (commonly sold under the VELCRO® trademark). In these positions, the bulkheads 20 and 30 extend from the ceiling 14 to the floor 16 of the container 10 and from the side wall 12 to the side wall 13.

Figure 4:
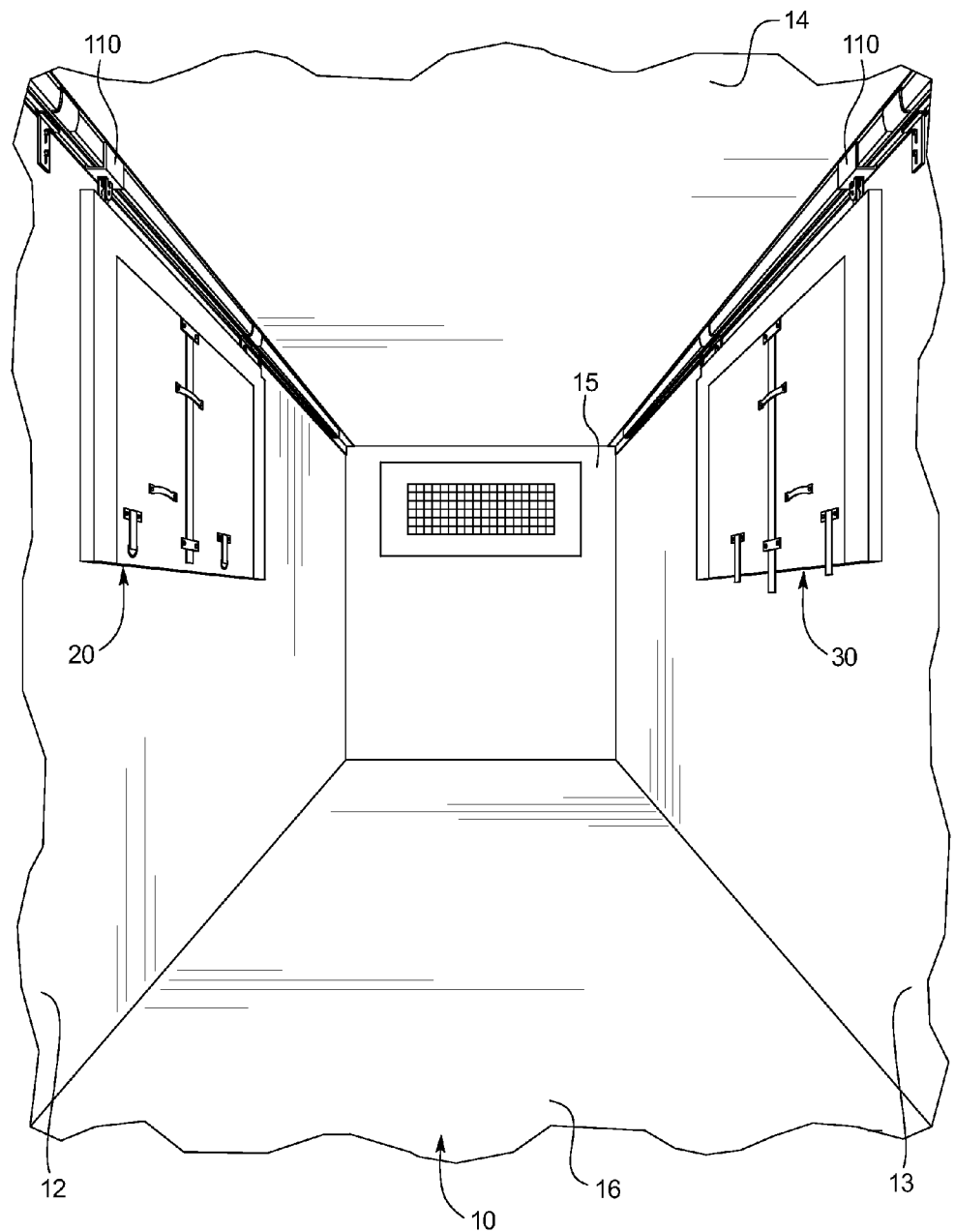
FIG. 4 is a fragmentary perspective view of the inside of a container (and specifically a refrigerated trailer), and illustrates two bulkheads each respectively attached to the container using a bulkhead tether apparatus of one embodiment of the present disclosure, and showing the bulkheads in substantially horizontally extending storage positions adjacent to the respective opposing side walls of the container.

FIG. 4 illustrates the inside of the container 10 with the bulkheads 20 and 30 respectively attached to the side walls 12 and 13 of the container 10 by one embodiment of the bulkhead tether apparatus of the present disclosure. The bulkheads 20 and 30 are mounted in a substantially horizontally extending alternative storage positions which are off of the floor 16 of the container 10.

Two bulkhead tether apparatuses of the present disclosure are respectively used to attach the bulkheads 20 and 30 inside the container 10. The two bulkhead tether apparatuses are identical in this embodiment, and thus only the bulkhead apparatus (generally indicated by numeral 40 in FIG. 3) used to attach bulkhead 30 adjacent to side wall 13 is discussed herein for brevity. It should be appreciated that the bulkhead tether apparatuses of the present disclosure do not need to be identical.

Figure 3:
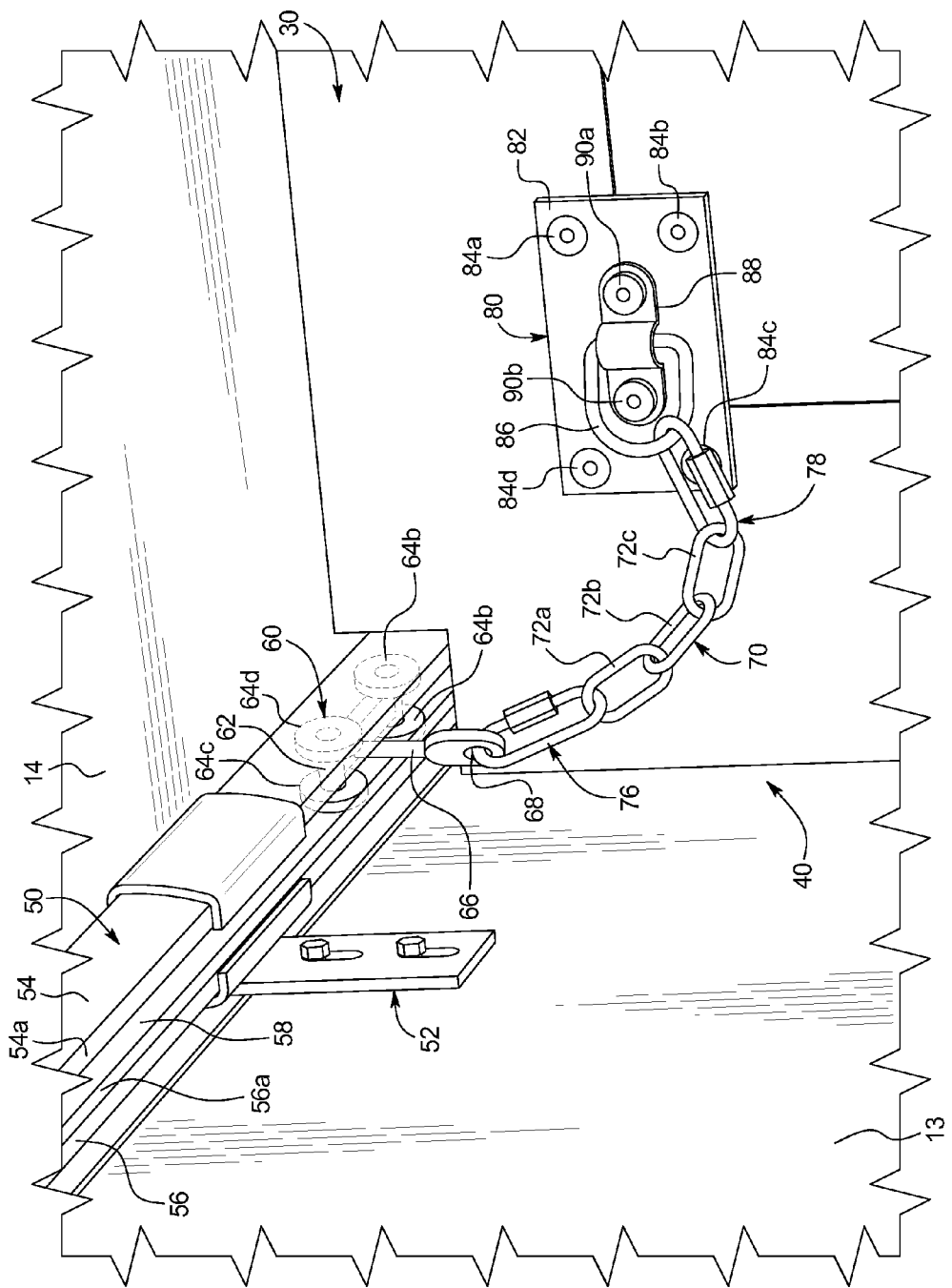
FIG. 3 is an enlarged fragmentary perspective view of a bulkhead tether apparatus of one embodiment of the present disclosure, shown attached to the inside of the container and to a bulkhead.

The bulkhead tether apparatus 40 illustrated in FIG. 3 generally includes: (a) a roller track 50; (b) a trolley 60 configured to be movably attached to or inside of the roller track 50; (c) a bulkhead bracket 80 securely attachable to the bulkhead 30; and (d) a relatively short chain 70 releasably attachable to the trolley 60 and releasably attachable to the bulkhead bracket 80.

More specifically, the roller track 50 is configured to be attached at the upper corner of the container 10 where the ceiling 14 meets the side wall 13 of the container 10 as shown in FIGS. 1, 2, 3, and 4. The roller track 50 is configured to be attached to the upper portion of the side wall 13 by a plurality of roller track attachment brackets such as roller track attachment bracket 52 which is shown in FIG. 3 attached to the side wall 13. This illustrated roller track 50 has a generally upside down U-shape and is configured to receive the trolley 60 as generally shown in FIG. 3. The roller track 50 include an elongated top wall (not shown) and two opposing spaced apart elongated L-shaped legs 54 and 56 integrally connected to and extending downwardly from the top wall. The L-shaped legs 54 and 56 respectively include generally transversely, horizontally, or substantially horizontally extending elongated roller supports or tracks 54a and 56a configured to support the wheels or rollers 64a, 64b, 64c, and 64d of the trolley 60. The elongated roller supports or tracks 54a and 56a define an elongated opening 58 through which the stem 66 of the trolley 60 extends. One or more suitable stopping members (not shown) are attached to or mounted in the roller track 50 such as at or near one or more of the ends of the roller track 50 to prevent the trolley 60 from coming out of the roller track 50 on either end of the roller track 50. The front end of the roller track 50 can also be mounted adjacent to the front wall 15 inside of the container 10 to prevent the trolley 60 from coming out of the roller track 50 at that end. In this illustrated embodiment, the roller track is made from steel; however, the roller track can be made from any suitable materials and in any suitable size and shape.

The trolley 60 is configured to be movably mounted in the roller track 30 as generally shown in FIG. 3. In this illustrated embodiment, the trolley 60 is configured to be inserted in the roller track 50 from one end of the track (before the stopping member is attached to the roller track 50) and be freely movable in the roller track 50. In this illustrated embodiment, the trolley 60 includes a body 62, four wheels or rollers 64a, 64b, 64c, and 64d rotatably attached to the body 62, and a stem 66 extending downwardly from the body 62. The stem 66 defines an attachment opening 68. In this illustrated embodiment, the trolley is made from aluminum and steel; however, the trolley can be made from any suitable materials and in any suitable size and shape so long as it is freely movable with respect to the roller track.

It should be appreciated that other suitable configurations for the roller track and trolley are contemplated in accordance with the present disclosure.

The bulkhead bracket 80 is configured to be securely attached to the top of a bulkhead such as bulkhead 30 as generally shown in FIG. 3. The bulkhead bracket 80 generally includes a base 82 secured (by suitable fasteners 84a, 84b, 84c, and 84d) to the bulkhead 30 adjacent to the upper corner of the bulkhead 30. The bulkhead bracket 80 further includes an engagement loop or ring 86 pivotably connected to the base 82 by bracket 88 which is secured to the base 82 by suitable fasteners 90a and 90b. This configuration enables the engagement loop or ring 86 to pivot in a horizontal or substantially horizontal direction. The pivoting and configuration of the engagement loop or ring 86 and the configuration of the chain 70 as explained below enables the chain to engage the engagement loop or ring 86 in a plurality of different positions including substantially horizontal positions and substantially vertical positions. In this illustrated embodiment, the bulkhead bracket is made from steel; however, the bulkhead bracket can be made from any suitable materials and in any suitable size and shape.

The relatively short chain 70 is configured to be releasably attachable to the trolley 60 and releasably attachable to the bulkhead bracket 80 as generally show in FIG. 3. This illustrated chain 70 includes a plurality of oblong closed links 72a, 72b, and 72c, and a plurality of oblong openable links 76 and 78. The openable link 76 is openable to attach the chain 70 to the stem 66 of the trolley 60, and closeable to secure the chain to the stem 66 of the trolley 60 as shown in FIG. 3. The openable link 78 is openable to attach the chain 70 to the engagement loop or ring 86 of the bulkhead bracket 80, and closeable to secure the chain 70 to the engagement loop or ring 86 of the bulkhead bracket 80 as shown in FIG. 3. In this embodiment, the openable links are carabineers with or without springs, although it should be appreciated that they may be in other forms. It should be appreciated that the length of the chain 70 is relatively short and is selected to enable certain movements of the bulkhead 30 and to limit other movements of the bulkhead 30, as further described below, and to ensure that the bulkhead 30 and the trolley 60 are separated by at most a predetermined distance. In this illustrated embodiment, the chain is made from steel; however, the chain can be made from any suitable materials and in any suitable size and shape so long as it is freely movable with respect to the roller track and so long as it is within a designated length range.

This combination of the roller track (including any stopping members), the trolley, relatively short chain, and bulkhead bracket provides several advantages. This combination is relatively inexpensive and relatively easy to install and repair, in part because it has relatively few parts, relatively less expensive parts, and is configured to be installed in a straightforward manner. This combination enables the bulkhead to travel the length of the roller track, but prevents the bulkhead from being removed from the container. This combination enables the bulkhead to be moved out of the way during loading and unloading in several different ways. In one way, this combination enables the bulkhead to swing 90 degrees forward from extending across the container (in an upright position as shown in FIG. 2) to extending adjacent to the side wall (in an upright position) as shown in FIG. 1. In another way, this combination enables the bulkhead to swing 90 degrees rearward from extending across the container (in an upright position as shown in FIG. 2) to extending adjacent to the side wall (in an upright position). Thus, this combination enables the bulkhead to swing either forward or rearward to move out of the way when products are loaded into or unloaded from the container.

This combination also enables the bulkhead to be moved completely out of the way and off of the floor 16. After swinging adjacently to the side wall, this combination also enables the bulkhead to swing upwardly 90 degrees from an upright position against the side wall to a horizontally or substantially horizontally extending position adjacent to the side wall as shown in FIG. 4. A second trolley 110, second bulkhead bracket (not shown), and a line or rope (not shown) are employed in this embodiment to lift the bottom end of the bulkhead off of the floor 16. In this embodiment, the second trolley 110 is movably mounted to or in the roller track 50, the second bulkhead bracket is attached to the bottom corner of the bulkhead 30, and the line or rope is releasably attached to the second trolley 110 or stem of the second trolley 110 and the second bulkhead bracket. This enables the bulkhead to be lifted off of the floor 16. Thus, in this embodiment, the bulkhead tether apparatus includes a second trolley, a second or lower bulkhead bracket, and line or rope.

In a further embodiment which is not shown, the bulkhead tether apparatus includes a third trolley and a rope or line holder attached to the third trolley and configured to hold the rope or line out of the way.

It should be understood that modifications and variations may be effected without departing from the scope of the novel concepts of the present disclosure, and it should be understood that this application is to be limited only by the scope of the appended claims.

The invention is claimed as follows:

1. A bulkhead tether system comprising:
 a roller track;
 a first trolley configured to be movably attached to the roller track;
 a first bulkhead bracket securely attachable to a bulkhead;
 a chain attachable to the trolley and to the bulkhead bracket;
 a second trolley configured to be movably attached to the roller track; and
 a second bulkhead bracket securely attachable to the bulkhead such that a line can be attached to the second trolley and the second bulkhead bracket to lift a bottom end of the bulkhead.

2. The bulkhead tether system of claim 1, wherein the roller track is configured to be attached at a corner defined by a ceiling and a side wall of a container.

3. The bulkhead tether system of claim 2, wherein the roller track, the first trolley, the first bulkhead bracket, and the chain are configured to enable the bulkhead to swing both forward and rearward from extending across the container in a first upright position to extending adjacent to the side wall in a second upright position.

4. The bulkhead tether system of claim 3, wherein the roller track, the first trolley, the first bulkhead bracket, and the chain are configured to enable the bulkhead to swing upwardly from the second upright position adjacent to the side wall to a substantially horizontally extending position adjacent to the side wall.

5. The bulkhead tether system of claim 1, wherein the first trolley is movably positionable in a channel defined by the roller track.

6. The bulkhead tether system of claim 1, wherein the first trolley includes a body, a plurality of wheels rotatably attached to the body, and a stem extending from the body.

7. The bulkhead tether system of claim 6, wherein the roller track includes an elongated top wall and two opposing spaced apart elongated L-shaped legs integrally connected to and extending downwardly from the top wall, said L-shaped legs respectively including transversely extending elongated wheel supports configured to support the wheels of the first trolley, said elongated wheel supports defining an elongated opening through which the stem of the first trolley can extend.

8. The bulkhead tether system of claim 7, which includes at least one stopping member attachable to or mounted in the roller track.

9. The bulkhead tether system of claim 1, wherein the first bulkhead bracket includes a base securable by suitable fasteners to the bulkhead adjacent to an upper corner of the bulkhead.

10. The bulkhead tether system of claim 9, wherein the first bulkhead bracket includes an engagement loop or ring pivotably connected to the base by a bracket.

11. The bulkhead tether system of claim 1, wherein the chain is releasably attachable to the first trolley and releasably attachable to the first bulkhead bracket.

12. The bulkhead tether system of claim 1, wherein the chain includes a plurality of links including a plurality of openable links, a first one of the openable links is attachable to the first trolley, and a second one of the openable links is attachable to the first bulkhead bracket.

13. A bulkhead tether system comprising:
 a roller track including an elongated top wall and two opposing spaced apart elongated L-shaped legs connected to and extending downwardly from the top wall, said L-shaped legs respectively including transversely extending elongated roller supports, said elongated roller supports defining an elongated opening, said roller track configured to be attached at a corner defined by a ceiling and a side wall of a container;
 a trolley including a body, a plurality of wheels rotatably attached to the body, and a stem extending from the body, said trolley configured to be movably attached to the roller track such that the wheels are rotatable along the elongated roller supports and the stem extends through the elongated opening;
 a bulkhead bracket including a base securable by suitable fasteners to the bulkhead adjacent to an upper corner of the bulkhead, and an engagement loop or ring pivotably connected to the base by a bracket; and a chain releasably attachable to the trolley and releasably attachable to the bulkhead bracket;

wherein the roller track, the trolley, the bulkhead bracket, and the chain are configured to enable the bulkhead to swing both forward and rearward from extending across the container in a first upright position to extending adjacent to the side wall in a second upright position;

wherein the roller track, the trolley, the bulkhead bracket, and the chain are configured to enable the bulkhead to swing upwardly from the second upright position adjacent to the side wall to a substantially horizontally extending position adjacent to the side wall.

14. The bulkhead tether system of claim 13, which includes at least one stopping member attachable to or mounted in the roller track.

15. The bulkhead tether system of claim 13, wherein the chain includes a plurality of links including a plurality of openable links, a first one of the openable links is attachable to the trolley and a second one of the openable links is attachable to the bulkhead bracket.

16. The bulkhead tether system of claim 13, which includes a second trolley configured to be movably attached to the roller track, a second bulkhead bracket securely attachable to the bulkhead, a line configured to be attached to the second trolley and the second bulkhead bracket to lift a bottom end of the bulkhead.

17. A bulkhead tether system comprising:
a roller track;
a first trolley configured to be movably attached to the roller track;
a first bulkhead bracket securely attachable to a bulkhead;
a chain attachable to the trolley and to the bulkhead bracket;
a second trolley configured to be movably attached to the roller track;
a second bulkhead bracket securely attachable to the bulkhead; and
a line configured to be attached to the second trolley and the second bulkhead bracket to lift a bottom end of the bulkhead.

18. The bulkhead tether system of claim 17, wherein the roller track is configured to be attached at a corner defined by a ceiling and a side wall of a container.

19. The bulkhead tether system of claim 18, wherein the roller track, the first trolley, the first bulkhead bracket, and the chain are configured to enable the bulkhead to swing both forward and rearward from extending across the container in a first upright position to extending adjacent to the side wall in a second upright position.

20. The bulkhead tether system of claim 19, wherein the roller track, the first trolley, the first bulkhead bracket, and the chain are configured to enable the bulkhead to swing upwardly from the second upright position adjacent to the side wall to a substantially horizontally extending position adjacent to the side wall.

21. The bulkhead tether system of claim 17, wherein each of the first trolley and the second trolley includes a body, a plurality of wheels rotatably attached to the body, and a stem extending from the body.

22. The bulkhead tether system of claim 21, wherein the roller track includes an elongated top wall and two opposing spaced apart elongated L-shaped legs integrally connected to and extending downwardly from the top wall, said L-shaped legs respectively including transversely extending elongated wheel supports configured to support the wheels of each of the first trolley and the second trolley, said elongated wheel supports defining an elongated opening through which the stem of each of the first trolley and the second trolley can extend.

* * * * *